US012712719B2

(12) United States Patent
Cartigny et al.

(10) Patent No.: US 12,712,719 B2
(45) Date of Patent: Aug. 18, 2026

(54) METHOD FOR TRANSMITTING CONTENT USING A QUANTUM KEY DISTRIBUTION NETWORK

(71) Applicant: Airbus Defence and Space SAS, Toulouse (FR)

(72) Inventors: Marc Cartigny, Elancourt (FR); Maxime Labonne, Elancourt (FR); Jorge Lopez-Coronado, Elancourt (FR); Claude Poletti, Elancourt (FR)

(73) Assignee: Airbus Defence and Space SAS, Toulouse (FR)

(*) Notice: Subject to any disclaimer, the term of this patent is extended or adjusted under 35 U.S.C. 154(b) by 174 days.

(21) Appl. No.: 18/543,487

(22) Filed: Dec. 18, 2023

(65) Prior Publication Data

US 2024/0204997 A1 Jun. 20, 2024

(30) Foreign Application Priority Data

Dec. 20, 2022 (FR) ....................................... 2214010

(51) Int. Cl.
*H04L 9/08* (2006.01)

(52) U.S. Cl.
CPC .................................. *H04L 9/0855* (2013.01)

(58) Field of Classification Search
CPC . H04L 9/0855; H04L 63/0435; H04L 63/145; H04L 63/062
See application file for complete search history.

(56) References Cited

U.S. PATENT DOCUMENTS 8,650,401 B2 * 2/2014 Wiseman .............. H04L 63/061 380/256
8,705,743 B2 * 4/2014 Howard ................ H04L 63/104 380/255

(Continued)

FOREIGN PATENT DOCUMENTS

CN 102740246 * 10/2017 ........... H04L 9/0631
CN 112422284 * 2/2021 ............. H04B 10/70

(Continued)

OTHER PUBLICATIONS

French Search Report for corresponding French Patent Application No. 2214010 dated Jul. 19, 2023.

(Continued)

*Primary Examiner* — Hadi S Armouche

(74) *Attorney, Agent, or Firm* — Greer, Burns & Crain, Ltd.

(57) ABSTRACT

A method for transmitting content (A) in a communication network (N) comprising a quantum key distribution network (QKDN) for keys, called quantum keys (Knj), the communication network comprising a key management device (KM) connected to transmission nodes (N1, N2, N3, N4, N5) and connected to said quantum key distribution network (QKDN), said transmission nodes (N1, N2, N3, N4, N5) being able to communicate in the communication network and transmit and receive quantum keys (Knj) in said quantum key distribution network, said method comprising sending and receiving control messages from and to said control plan manager (CP) in order to organise the transfer of said content (A) in said communication network (N). Also a control plan management device (CP) configured to execute such a method.

10 Claims, 10 Drawing Sheets

(56) References Cited

U.S. PATENT DOCUMENTS

| | | | | |
|---|---|---|---|---|
| 8,788,805 | B2 * | 7/2014 | Herne | H04L 63/0428<br>713/153 |
| 9,912,479 | B1 * | 3/2018 | Yamada | H04L 9/002 |
| 11,115,200 | B2 * | 9/2021 | Fu | H04L 9/0858 |
| 11,212,082 | B2 * | 12/2021 | Tomlinson | H04L 9/0891 |
| 11,309,974 | B2 * | 4/2022 | Griffin | H04B 10/70 |
| 11,363,073 | B2 * | 6/2022 | Maino | H04L 63/0272 |
| 12,028,450 | B2 * | 7/2024 | Su | H04L 9/08 |
| 2011/0213979 | A1 * | 9/2011 | Wiseman | H04L 9/0844<br>713/171 |
| 2015/0281953 | A1 * | 10/2015 | Liu | H04W 76/14<br>380/283 |
| 2019/0327611 | A1 * | 10/2019 | Middelesch | H04W 12/033 |
| 2023/0188334 | A1 * | 6/2023 | Li | H04L 9/12<br>380/278 |
| 2023/0388105 | A1 * | 11/2023 | Kaino | H04L 63/062 |
| 2024/0291642 | A1 * | 8/2024 | Gunkel | H04L 9/14 |
| 2025/0240153 | A1 * | 7/2025 | Labonne | H04L 9/0852 |

FOREIGN PATENT DOCUMENTS

| | | | | |
|---|---|---|---|---|
| CN | 113438032 | * | 9/2021 | H04B 10/70 |
| EP | 3780482 | A1 | 2/2021 | |
| EP | 3907927 | A1 | 11/2021 | |

OTHER PUBLICATIONS

Xuefu Wang Quantumctek Co. et al., “Proposal on the Key Relay Function of Key Management of Quantum Key Distribution Network” Vo;. 16/13, May 7, 2019, pp. 1-3; https://www.itu.int/ifa/t/2017/sg13/exchange/wp3/q16/201905/Contributions/C22.

* cited by examiner

METHOD FOR TRANSMITTING CONTENT USING A QUANTUM KEY DISTRIBUTION NETWORK

CROSS-REFERENCES TO RELATED APPLICATIONS

This application claims the benefit of French patent application no. 2214010 filed on De. 20, 2022, the entire disclosure of which is incorporated herein by way of reference.

FIELD OF THE INVENTION

The present invention relates to a method for transmitting content between two transmission nodes of a communication network comprising a quantum key distribution network. At least one embodiment relates to the transmission of an encryption key between two transmission nodes of a communication network. The invention more specifically relates to managing the sequencing of operations useful for transmitting content using a quantum key distribution network, by virtue of control messages.

BACKGROUND OF THE INVENTION

It is known that an encryption key, also commonly called cryptographic key, can be securely transferred between two transmission nodes of a communication network using a quantum key distribution network. The purpose of this encryption key transfer, which allows it to be shared between two participants, namely its sender and its recipient, is to then implement encrypted communications between these two participants. A quantum key distribution network is considered to be "quantum" insofar as it manipulates keys, called quantum keys, for which the interception difficulty is not based on an assumed computational (mathematical) difficulty of a problem (as is the case for many cryptographic methods) but on fundamental properties of quantum physics applied to particles of the photon type. Implementing a quantum key exchange is based on the ability to generate random quantum objects, to measure these quantum objects, and then to transmit them over sufficient distances, for example, between two transmission nodes of a communication network, on a communication layer, called quantum communication layer, using optical means. The security of quantum key exchange protocols assumes that, according to a theorem, called no-cloning theorem, an adversary cannot learn the state of a particle before it is measured, and that measuring the state of a quantum particle alters its state. This security is therefore based on a property of quantum physics.

Symmetrical encryption key sharing methods between a sender and a recipient connected to the same communication network use quantum transmission nodes each configured to perform transmissions in a conventional communication layer, for example, according to an IP protocol, and to perform only quantum key transmissions in an optical quantum communication layer, called quantum layer, by taking advantage of a key management device connected to the transmission nodes. According to these methods, the key management device that is used receives intermediate results of a quantum key derivation function, which function has particular properties, from a source transmission node (transmitter of the encryption key to be shared) and from one or more intermediate transmission nodes, between which quantum keys circulate, and then transmits, to a recipient transmission node (the receiver of the encryption key to be shared), a final result of operations executed by the key management device, from which the recipient transmission node can retrieve the encryption key to be shared, without said key circulating in the communication network and without it being possible to retrieve it from an intermediate result transmitted in the communication network. Such a method for sharing an encryption key is described in the section of the description of the present application relating to FIGS. 1 and 2, in an example whereby a key derivation function KDF is the function called exclusive or function, still commonly called xor and whose operator is represented herein by the symbol "$\oplus$", applied to two data items, called input data. Although this principle of key transfer between a source transmission node and a recipient transmission node is known, it is not more widely used for transmitting any content through a communication network, such as, for example, a mesh network, insofar as no control protocol exists that is dedicated to implementing such a transfer via a plurality of transmission nodes operating in a communication network and also being included in a quantum key distribution network.

The situation can be improved.

SUMMARY OF THE INVENTION

An aim of the present invention is to allow secure transmission of content in a communication network by taking advantage of the level of transmission security provided by encryption key sharing methods by virtue of a quantum key distribution network.

To this end, a method is proposed for transmitting content between two transmission nodes of a communication network comprising these two transmission nodes and at least one other transmission node, called intermediate transmission node, the transmission nodes also being included in a quantum key distribution network for keys, called quantum keys, the communication network comprising a key management device connected to said transmission nodes and connected to said quantum key distribution network, the transmission nodes each comprising a plurality of communication interfaces for communicating in the communication network and a plurality of quantum key transmission interfaces for transmitting and receiving said quantum keys in said quantum key distribution network, and the transmission nodes further being configured to each implement a key derivation function and send the result thereof to said key management device and to each implement a key extraction function from information received from said key management device and a received quantum key, said communication network further comprising a control plan management device, the method comprising, executed in said control plan management device:

- receiving, from a node, called source node, from among said two transmission nodes, a request message requesting transmission of said content to the other node, called recipient node, from among said two transmission nodes, said request message comprising an identifier of said recipient node;
- acquiring a route determined as passing through said at least one intermediate transmission node or through a series of intermediate transmission nodes between said source node and said recipient node, and a transmission service identifier for said content associated with said route;
- transmitting and receiving control messages to and from said transmission nodes and to said key management device, suitable for generating key transmissions between pairs of nodes from among said nodes, defined according to said route determined in relation to said transmission service identifier.

Thus, it is advantageously possible to transmit any content end-to-end, between a source transmission node and a recipient transmission node of a communication network comprising a quantum key distribution network, while providing a very high level of security, by virtue of simple and centralised management.

The method according to the invention can also comprise the following features, considered alone or in combination:

- sending and receiving control messages comprises:
  - sending, to said key management device, a control message comprising said transmission service identifier;
  - sending, to said source node, a control message comprising at least said service identifier and an identifier of a quantum key emission interface;
  - receiving, from said source node, a control message comprising at least one quantum key identifier and said transmission service identifier for said content;
  - sending, to each intermediate transmission node, a control message comprising at least said service identifier, a quantum key reception interface identifier, and a quantum key identifier received or to be received via said quantum key reception interface and a quantum key emission interface identifier;
  - receiving, from each intermediate transmission node, a control message comprising at least one quantum key identifier and said transmission service identifier for said content;
  - sending, to said key management device, a control message comprising an end of sequence identifier and an identifier of the recipient node; and
  - sending, to said recipient node, a control message comprising at least said service identifier, a quantum key reception interface identifier and a quantum key identifier received or to be received via said quantum key reception interface;
- sending the control message to said source node and sending a control message to each of said intermediate nodes further comprises a unique sequence identifier from a series of unique sequence identifiers determined for said transmission of said content in relation to said service identifier, each unique sequence identifier from said series of unique identifiers being able to determine the rank of a sequence with which it is associated in a series of sequences defined in relation to said transmission of said content.

Advantageously, it is thus possible to use a non-commutative key derivation function KDF and to perform rerouting during transmission, in the event of a malfunction of a link in the communication network.

- the key derivation function has properties according to which said function applies to two data items, called input data, and the result of said function applied to said two data items is zero when said two data items are equal to each other and the result of said function applied to said two data items is equal to one of said two data items when the other one of said two data items is zero;
- the key derivation function is an "exclusive OR" function and said two data items are in the form of binary words with identical sizes.

A further aim of the invention is a control plan management device configured to control the transmission of content between two transmission nodes of a communication network comprising said two transmission nodes and at least one other transmission node, called intermediate transmission node, said transmission nodes also being included in a quantum key distribution network for keys, called quantum keys, the communication network comprising a key management device connected to said transmission nodes and connected to said quantum key distribution network, said transmission nodes each comprising a plurality of communication interfaces for communicating in the communication network and a plurality of quantum key transmission interfaces for transmitting and receiving said quantum keys in said quantum key distribution network, and said transmission nodes being further configured to each implement a key derivation function and send the result thereof to said key management device and to each implement a key extraction function from information received from said key management device and a quantum key, said communication network further comprising a control plan management device, said control plan management device being characterised in that it comprises electrical and electronic circuitry configured for:

- receiving, from a node, called source node, from among said two transmission nodes, a request message requesting transmission of said content to the other node, called recipient node, from among said two transmission nodes, said request message comprising an identifier of said recipient node;
- acquiring a route determined as passing through said at least one intermediate transmission node or through a series of intermediate transmission nodes between said transmission node and said recipient node, and a transmission service identifier for said content associated with said route;
- transmitting and receiving control messages to and from said transmission nodes and to said key management device, suitable for generating transmissions of quantum keys between pairs of nodes from among said nodes, defined according to said route determined in relation to said transmission service identifier.

The control plan management device according to the invention can also comprise the following features, considered alone or in combination:

- The control plan management device further comprises electronic circuitry configured for:
  - sending, to said source node, a control message comprising at least said service identifier, an identifier of a quantum key emission interface;
  - receiving, from said source node, a control message comprising at least one quantum key identifier and said transmission service identifier for said content;
  - sending, to each intermediate transmission node, a control message comprising at least said service identifier, a quantum key reception interface identifier, and a quantum key identifier received or to be received via said quantum key reception interface, a quantum key emission interface identifier;
  - receiving, from each intermediate transmission node, a control message comprising at least one quantum key identifier and said transmission service identifier for said content;
  - sending, to said key management device, a control message comprising an end of sequence identifier and an identifier of the recipient node; and
  - sending, to said recipient node, a control message comprising at least said service identifier, a quantum key reception interface identifier and a quantum key identifier received or to be received via said quantum key reception interface.

The control plan management device further comprises electronic circuitry configured to introduce, into the control message to said source node and into the control message to each of said intermediate nodes, a unique sequence identifier from a series of unique sequence identifiers determined for said transmission of said content in relation to said service identifier, each unique sequence identifier from said series of unique identifiers being able to determine the rank of a sequence with which it is associated in a series of sequences defined in relation to said transmission of said content.

The invention further relates to a communication network comprising a plurality of transmission nodes, a key management device, and a control plan management device as described above, wherein each of the transmission nodes is further configured for:

- sending a message to the key management device, said message sent to said key management device comprising a key derivation function result, said service identifier and a sequence identifier from a series of unique identifiers determined for said transmission of said content in relation to said service identifier, each unique sequence identifier from said series of unique sequence identifiers being able to determine the rank of a sequence with which it is associated in a series of sequences defined in relation to said transmission of said content; and
- receiving, from said key management device, a message comprising said service identifier and a key derivation function result.

The invention also relates to a computer program product comprising program code instructions for executing the steps of a method as described above, when this program is executed by a processor of a control plan management device.

Finally, the invention also relates to a storage medium comprising a computer program product as described above.

BRIEF DESCRIPTION OF THE DRAWINGS

The aforementioned and other features of the invention will become more clearly apparent upon reading the following description of an embodiment, with said description being provided with reference to the accompanying drawings.

DETAILED DISCLOSURE OF EMBODIMENTS

Figure 1:
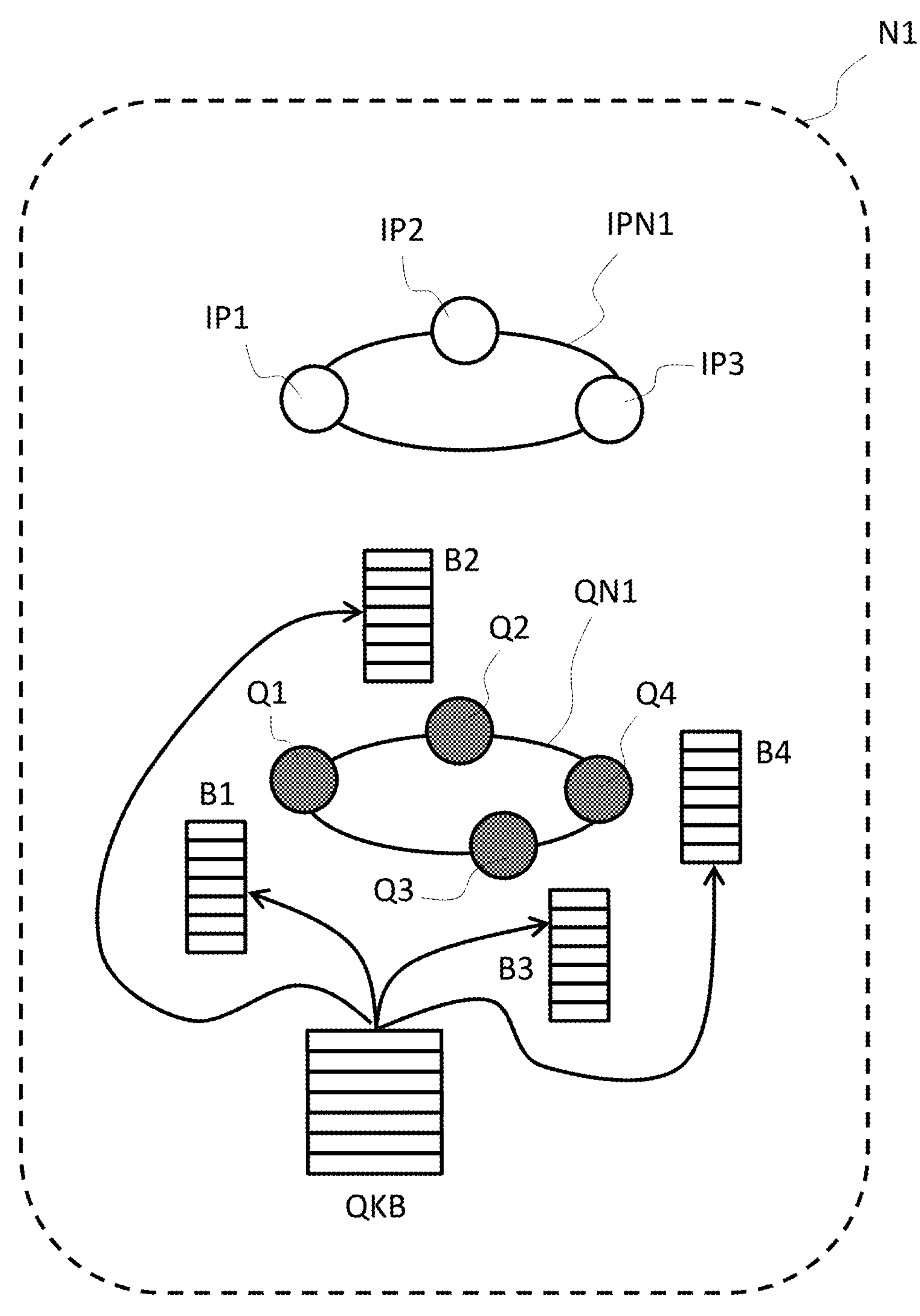
FIG. 1 schematically illustrates a transmission node of a communication network comprising a communication module via an IP network and a quantum key communication module.

FIG. 1 schematically illustrates a transmission node N1 configured to communicate in a communication network of the IP (Internet Protocol) network type and to participate in a quantum key distribution network adapted to the transmission of quantum keys between two neighbouring transmission nodes. The transmission node N1 can be integrated into any communication equipment, such as a router or an encryptor, for example. The transmission node N1 comprises a communication module IPN1 configured to communicate in an IP-type communication network. The communication module IPN1 comprises communication interfaces each able to transmit data in an IP-type communication network. According to the example described, the transmission node N1 comprises a communication interface IP1, a communication interface IP2 and a communication interface IP3, all able to transmit data via an IP-type communication network. The transmission node N1 also comprises a communication module QN1, called quantum module (of a type commonly called "QKD node"), configured for generating, storing and transmitting quantum keys. The quantum module QN1 comprises interfaces Q1, Q2, Q3 and Q4, called quantum interfaces, each configured to transmit quantum keys via optical transmission means. The quantum interfaces Q1, Q2, Q3 and Q4 are notably each designed to transmit quantum keys to similar interfaces (configured for reception) of a similar transmission node, for example, to a neighbouring node of a same communication network performing QKD node type quantum node functions in a quantum key distribution network. The quantum interfaces Q1, Q2, Q3 and Q4 are each further configured to receive quantum keys from an external source, via optical transmission means, for example, from a neighbouring node of a same communication network performing QKD node functions in a quantum key distribution network. According to one embodiment, the optical means are configured to transmit quantum keys through optical fibres or via "laser" technology communication means commonly called "Laser on the air" means. Each of the quantum interfaces Q1, Q2, Q3 and Q4 comprises a buffer memory for storing quantum keys supplied with quantum keys from a quantum key generator QKB. Thus, the quantum interface Q1 comprises a quantum key storage buffer memory B1; the quantum interface Q2 comprises a quantum key storage buffer memory B2; the quantum interface Q3 comprises a quantum key storage buffer memory B3 and the quantum interface Q4 comprises a quantum key storage buffer memory B4. According to one embodiment, the quantum key generator QKB supplies each of the storage buffer memories so that a quantum key can be delivered on a given quantum interface when quantum key transmission is required. For example, the quantum key generator QKB fills each of the buffer memories with the same predefined number of quantum keys before an initial transmission of a quantum key, and then maintains a fill level in each of the quantum key buffer memories B1, B2, B3 and B4 as quantum keys are transmitted by the quantum module QN1. According to one embodiment, the quantum keys generated and stored in the quantum key storage buffer memories have a predefined set size (width). According to an alternative embodiment, the size of a quantum key can be adjusted as a function of operating parameters, which are themselves adjusted as a function of specific requirements during use, optionally dynamically. According to one embodiment, the communication module IPN1 and the quantum module QN1 are controlled by a same control unit configured to synchronise their operation. Thus, for example, a control message can be received by the transmission node N1 via the communication module IPN1 and can be interpreted by the control unit of the transmission node N1 with the aim of generating the transmission of a quantum key via one of the quantum interfaces Q1, Q2, Q3 and Q4. According to an alternative embodiment, quantum keys are generated towards each of the quantum interfaces Q1, Q2, Q3 and Q4 and are transmitted to a neighbouring transmission node only when necessary, under the control of a dedicated control unit of the transmission node N1.

Figure 5:
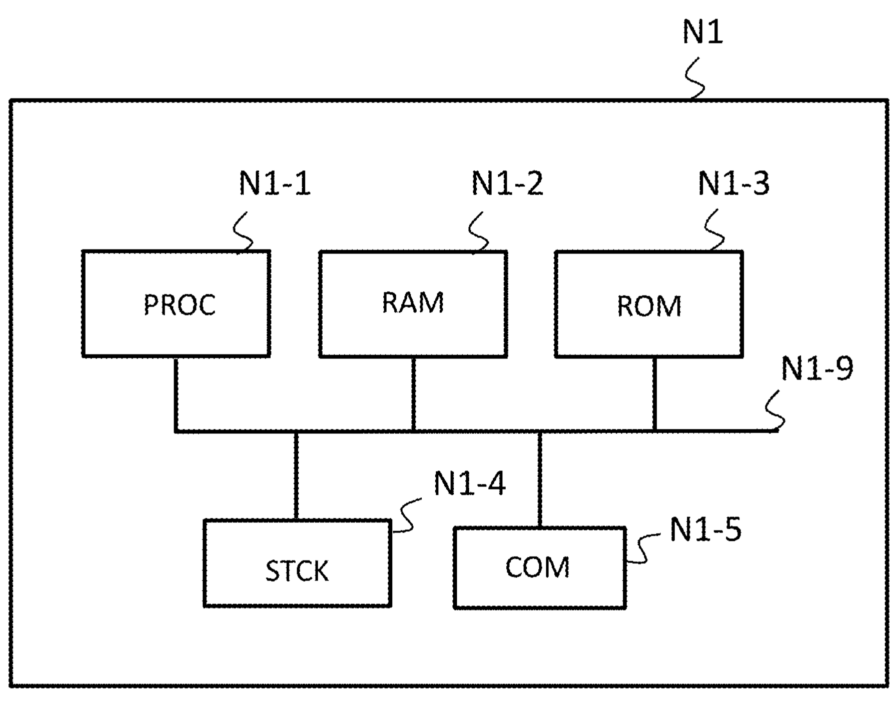
FIG. 5 illustrates an example of the internal architecture of a transmission node as described with reference to FIGS. 1, 2 and 3, according to one embodiment.

An example of the internal architecture of the internal control unit of the transmission node N1 is described hereafter with reference to FIG. 5.

The representation of the transmission node N1 in FIG. 1 does not show all these components, for the sake of simplification. For example, the transmission node N1 comprises an electronic control unit with microprocessor(s), not shown in FIG. 1 insofar as such implementation details of the transmission node N1 are not useful for a proper understanding of the invention. According to a similar principle, the implementation details of the quantum key generator QKB are not developed herein. The quantum key generator QKB of the transmission node N1 uses a random quantum generator and then a QKD ("Quantum Key Distribution") logic key generation system coupled with optical encoding of the keys, which are then able to circulate on an optical fibre. According to one embodiment, the quantum key generator QKB uses a slice of an optical beam of a continuous laser diode with an electro-optical modulator or by electrically pulsing a diode. According to the example shown in FIG. 1, the communication module IPN1 of the transmission node N1 comprises three communication interfaces IP1, IP2 and IP3 and the quantum module QN1 of the communication node IPN1 comprises four quantum interfaces Q1, Q2, Q3 and Q4. However, this example is not limiting and a similar communication node can comprise a different number of communication interfaces, as well as a different number of quantum interfaces.

The transmission node N1 is also configured to be able to transmit a result of a key derivation function KDF applied to two data items, called input data, to an external device, such as, for example, a key management device. For example, the transmission node N1 is configured to receive a first data item via one of its communication interfaces IP1, IP2 or IP3 and then to implement a key derivation function KDF, such as, for example, the "exclusive or" function, also commonly called the xor function, the operator of which is often represented by the symbol "⊕", between this first data item and a second input data item, and to then send the result of this key derivation function applied to the two input data items to a third-party device, via one of the communication interfaces IP1, IP2 and IP3. According to one example, the first input data item is a quantum key received via optical transmission means from a neighbouring transmission node connected to the node N1. According to another example, the first input data item is a data item received from an application layer, such as content to be transmitted in a communication network comprising the transmission node N1, or a fragment of such content.

The transmission node N1 can be associated with other similar transmission nodes in order to form a communication network, for example, a mesh or partially mesh communication network.

Figure 10:
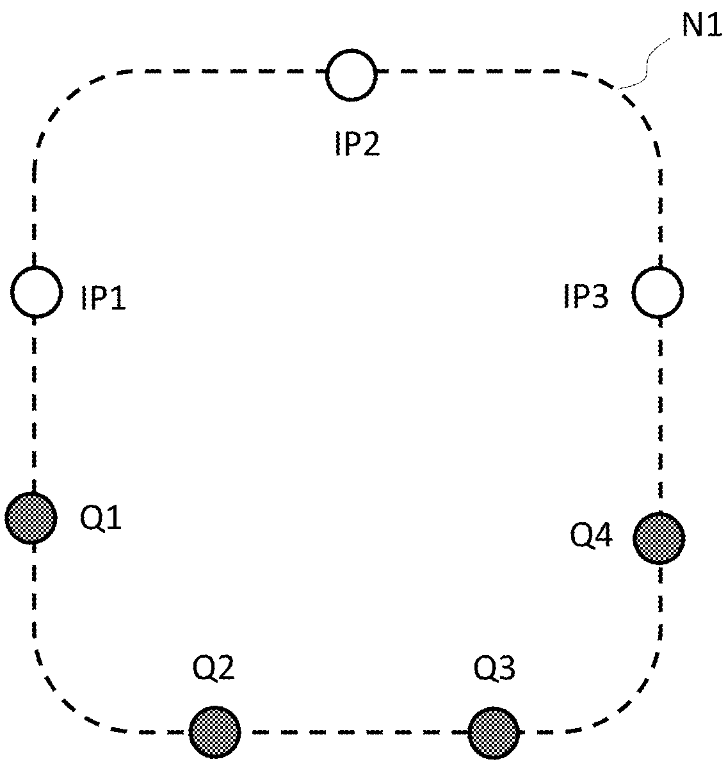
FIG. 10 is a schematic representation of a transmission node of the communication network already described in FIG. 3.

In the present description, a quantum key generated by the transmission node N1 and transmitted via the quantum interface Q1 of this transmission node N1 is denoted k11, a quantum key generated by the node N1 and transmitted via the quantum interface Q2 of this transmission node N1 is denoted k12, and so on. More generally, a quantum key generated by a transmission node Nn and transmitted via an interface Qj of this transmission node Nn is called quantum key Knj. According to one embodiment, each quantum key transmitted by the transmission node N1, or more broadly by a transmission node similar to the transmission node N1, is accompanied by a quantum key identifier that allows this quantum key to be referred to by means of this identifier. FIG. 10 is a simplified schematic representation of a transmission node as already described in FIG. 1, according to which the node is referred to by a transmission node identifier (in this case N1) and is characterised by the fact that it comprises IP-type communication interfaces (in this case IP1, IP2 and IP3 according to the example described) and quantum key transmission interfaces (in this case Q1, Q2, Q3 and Q4 according to the example described). Throughout the following description, examples of content transmission in a communication network N are developed. For the sake of simplification, the communication network N described hereafter comprises, in addition to the transmission node N1 shown herein, four transmission nodes N2, N3, N4 and N5 similar to the transmission node N1 and each comprising IP-type communication interfaces and quantum key transmission interfaces Q able to implement communications and transmissions of quantum keys according to the links shown and described between the various transmission nodes. Throughout the remainder of the description, the details of the IP interfaces and of the quantum interfaces Q are no longer shown, but the links between two quantum interfaces are illustrated by dashed lines and the links between IP interfaces are illustrated by solid lines.

Figure 2:
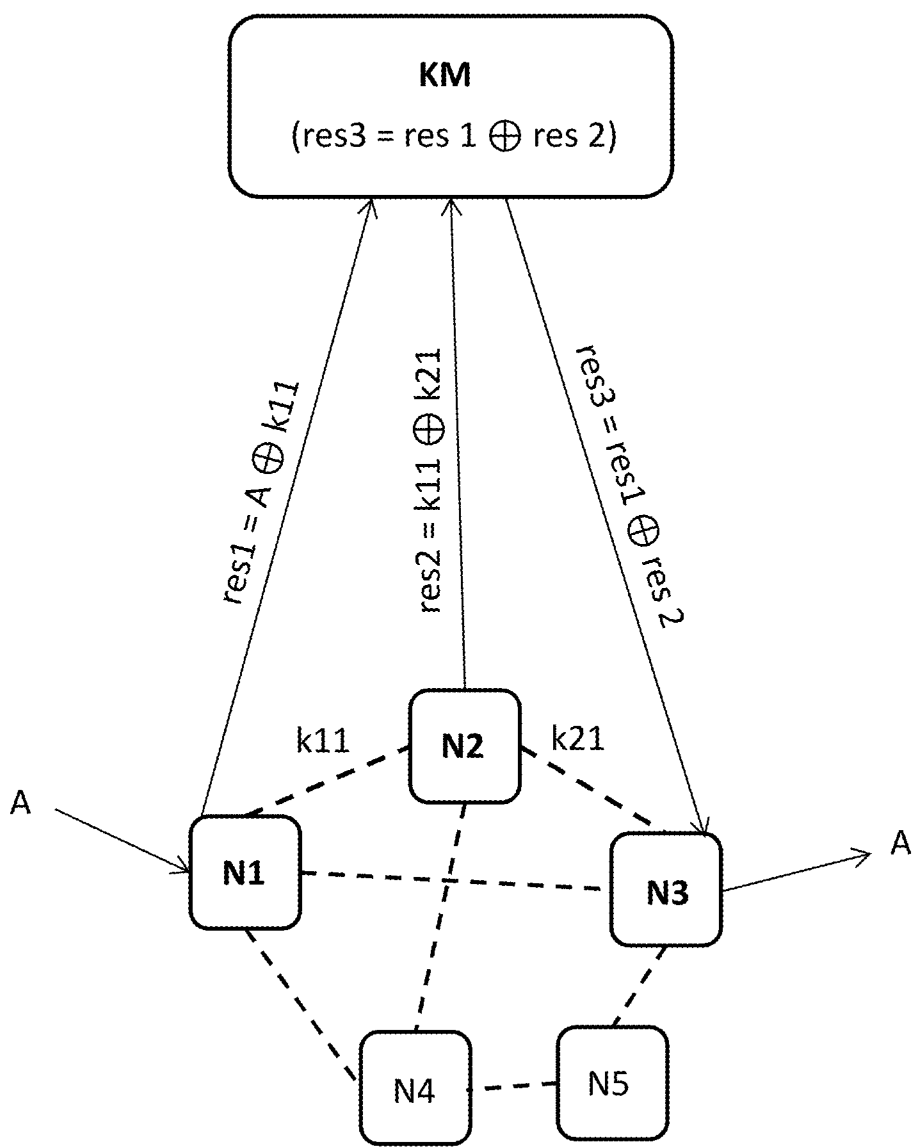
FIG. 2 schematically illustrates the transmission of content between two transmission nodes of a communication network, via an intermediate communication node, according to the prior art.

FIG. 2 illustrates an example of the transmission of content A through a communication network N comprising a quantum distribution network QKDN, according to the prior art. The network N comprises the transmission node N1 previously described with reference to FIG. 1, as well as the transmission nodes N2, N3, N4 and N5 similar to the transmission nodes N1, except that the number of communication interfaces in the network N and of quantum interfaces of each of the transmission nodes N2, N3, N4 and N5 can vary. According to one embodiment, the network N and the quantum key distribution network QKDN are mesh networks containing communication links respectively established between the transmission nodes N1 and N2, between the transmission nodes N2 and N3, between the transmission nodes N1 and N3, between the transmission nodes N1 and N4, between the transmission nodes N4 and N5, between the transmission nodes N5 and N3, and between the transmission nodes N2 and N4. Equivalent links exist with respect to the quantum key distribution layer, called "quantum layer", between quantum interfaces of these nodes, for the same inter-node links. In other words, a quantum key distribution link exists between transmission nodes N1 and N2, another quantum key distribution link exists between transmission nodes N2 and N3, and so on for the pairs of nodes N1 and N3, N1 and N4, N4 and N5, N5 and N3, and finally N4 and N2. Obviously, this example of the interconnection of nodes N1, N2, N3, N4 and N5 for the "conventional" communication layer according to an IP protocol, and for the quantum layer, is not limiting and the quantum mesh can use different interconnection links from those established in the quantum layer. According to the example of transmitting the content A illustrated with reference to FIG. 2, the transmission node N1 receives, from an application or an application module capable of communicating therewith, a message comprising a request for transmitting a content A to a recipient transmission node. This message is received via one of the communication interfaces of the transmission node N1. According to the example described, the recipient transmission node is the transmission node N3. The transmission node N1 that received the request to transmit the content A is called "source transmission node". According to a non-limiting example, the content A to be transmitted is a symmetrical encryption key to be used for subsequent secure sharing of content between the transmission nodes N1 and N3 (source and recipient). A transfer of content between transmission nodes N1 and N3 can be secured by a prior exchange, which itself is highly secure, of an encryption key by virtue of the procedure described hereafter:

The transmission node N1 receives the content A, accompanied by a message requesting transmission of this content, and performs a key derivation function KDF using the xor function as the key derivation function KDF applied to two input data items for the function, namely the received content A, on the one hand, and a quantum key k11, on the other hand, generated by the transmission node N1 and also delivered to the transmission node N2 via the quantum link between the transmission nodes N1 and N2.

A key derivation function result res1 is then sent by the transmission node N1 to a key management device KM, via a communication link established between the transmission node N1 and the key management device KM.

The transmission node N2 receives the quantum key k11 sent by the transmission node N1 via one of its quantum interfaces and performs a key derivation function using the xor function as the key derivation function KDF applied to two input data items for the function, namely the received quantum key k11, on the one hand, and a quantum key k21, on the other hand, generated by the transmission node N2 (and also delivered to the receiving transmission node N3 via the quantum link between the transmission nodes N2 and N3). A key derivation function KDF result res2 is then sent by the transmission node N2 to the key management device KM, via a communication link established between the transmission node N2 and the key management device KM.

The key management device KM performs an xor function between the result res1 received from the transmission node N1 and the result res2 received from the transmission node N2 and transmits a result res3 to the recipient transmission node N3, which can then retrieve the content A from the quantum key k21 received and transmitted by the transmission node N2.

Figure 6:
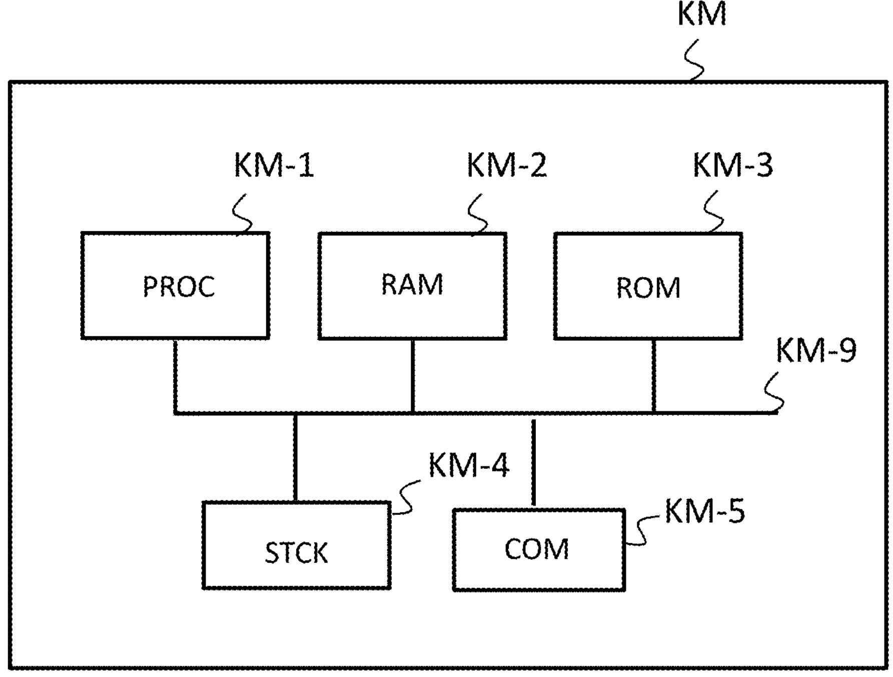
FIG. 6 illustrates an example of the internal architecture of a key management device as described with reference to FIGS. 1, 2 and 3, according to one embodiment.

An example of the internal architecture of the key management device KM is described hereafter with reference to FIG. 6.

According to this example, the content A (in this case an encryption key intended to secure subsequent exchanges) is considered to be transferred between the source transmission node N1 and the recipient transmission node N3 via the transmission node N2, which in this case is considered to be an intermediate transmission node, used jointly in combination with the key management device KM, so that the content A never legibly travels in the communication network N but can be ultimately determined by the recipient transmission node. This possibility is based on properties of the KDF xor derivation function, which states that:

$$(A \oplus k11) \oplus (k11 \oplus k21) = A \oplus k21. \quad \text{[EQ. 1]}$$

The intended security for transmitting the content A is ensured since, although the content A⊕k21 is available, it is only possible to retrieve the content A with knowledge of the quantum key k21. However, the transmission security level specific to quantum keys is high insofar as the quantum key distribution network QKDN has the known properties for resistance to a man-in-the-middle (MITM) attack, since an attempt to read all or part of a quantum key alters said key and an alteration of a quantum key can be detected by its recipient by virtue of the phenomenon of quantum entanglement. The content A is then available to an application or application module waiting for it on the recipient transmission node N3.

Advantageously, such transmission of the content A can be performed via a larger number of intermediate transmission nodes. According to another transmission example, the content A can be transmitted from the transmission node N1 (here a source transmission node) to the transmission node N5 (here a recipient transmission node) via the intermediate transmission nodes N2 and N4. According to this further example, successive two-input key derivation function KDF operation results are sent by the transmission nodes N1, N2 and N4 to the managers KM and quantum keys are sent in the quantum layer between the transmission nodes N1 and N2, then between the transmission nodes N2 and N4 and finally between the transmission nodes N4 and N5. The key management device KM then sends to the recipient transmission node N5 an operation result performed thereby:

$$(A \oplus k11) \oplus (k11 \oplus k22) \oplus (k22 \oplus k41) = A \oplus k41, \quad \text{[EQ. 2]}$$

where k11 is the quantum key transmitted between the transmission node N1 and the transmission node N2;

k22 is the quantum key transmitted between the transmission node N2 and the transmission node N4;

k41 is the quantum key transmitted between the transmission node N4 and the transmission node N5.

The content A in this case is transferred using the same secure transmission principle as in the previous example relating to the transmission of the content A between the source transmission node N1 and the recipient transmission node N3.

Although the principle for transmitting a symmetrical encryption key A is described, the implementation of any content transfer has not been carried out, in the absence of a method (or protocol) for managing interactions between the various elements of the communication network according to the prior art, described with reference to FIGS. 1 and 2.

Figure 3:
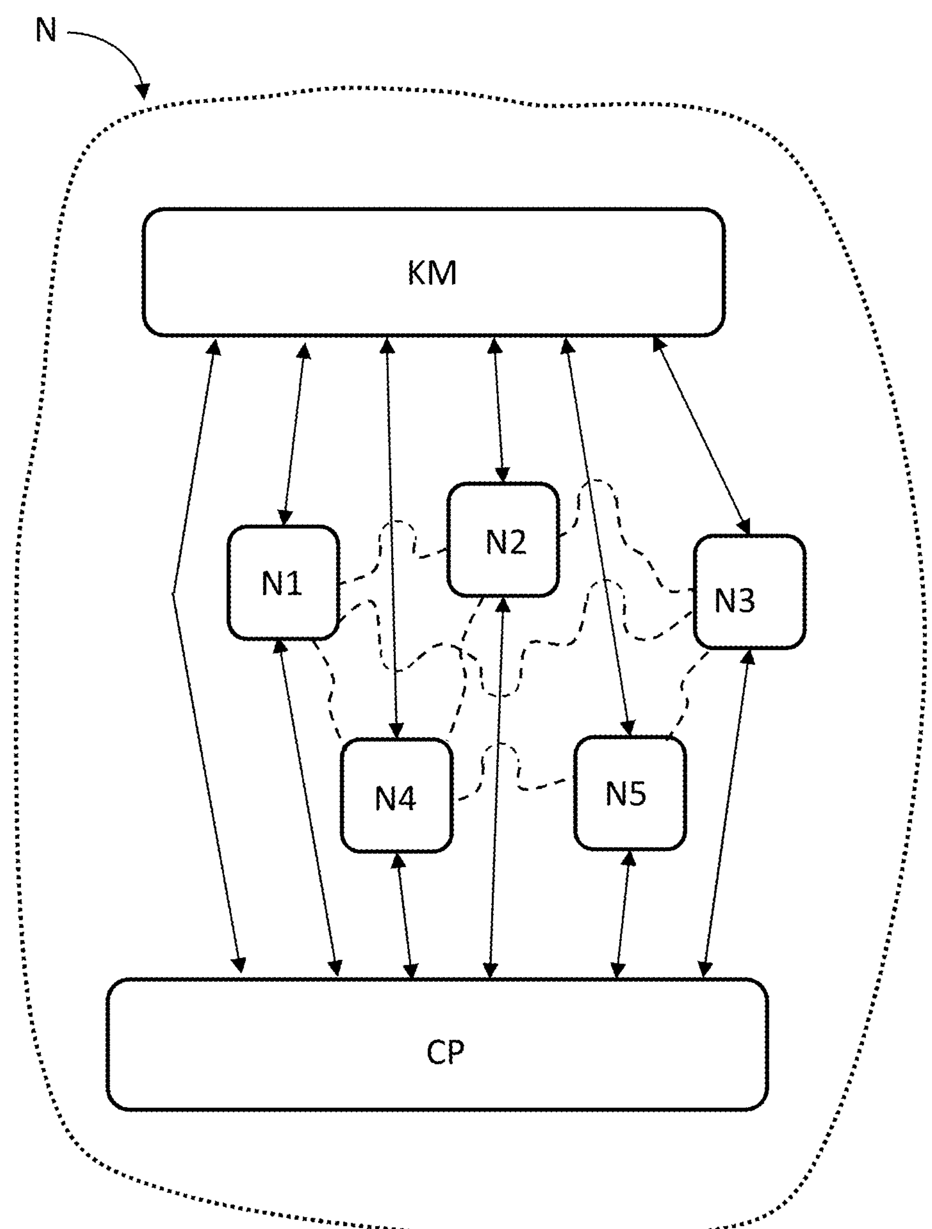
FIG. 3 schematically illustrates a communication network comprising transmission nodes, a key management device and a control plan management device, according to one embodiment.

FIG. 3 illustrates a clever use of a control plan management device CP for advantageously organising a sequence of operations useful for securely transferring any content between two transmission nodes of the communication network N. According to one embodiment, the control plan management device CP is centralised, which means that its resources are concentrated in a dedicated item of equipment or system, located at a precise point. According to an alternative embodiment, the control plan management device is distributed, which then means that, although it can be considered to be a management device or a system dedicated to organising the control plan of the communications network N, its resources can be distributed among a plurality of items of equipment remote from one another and configured to cooperate together to implement the management and control functions of the communications network N that are assigned to the control plan management device CP.

Figure 4:
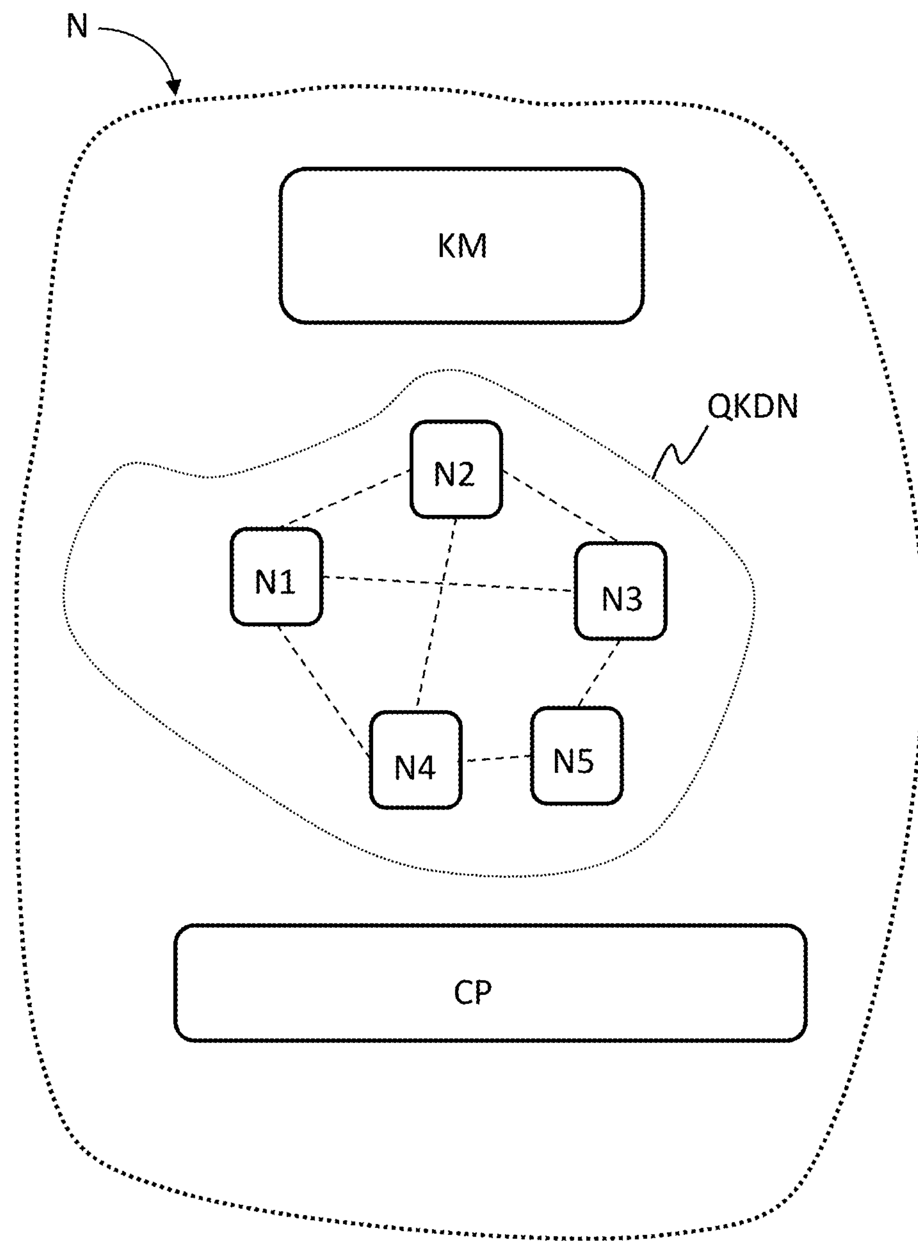
FIG. 4 schematically illustrates a quantum key distribution network included in the communication network already illustrated in FIG. 3, according to one embodiment.

The control plan management device CP is advantageously configured to be connected to the other devices in the communication network N and therefore can communicate with any transmission node operating in the communications network N, as well as with the key management device KM, under the control of a control unit inside the control plan management device CP. According to the example described, the control plan management device CP is not connected to the quantum key distribution network QKDN of the communication network N, as graphically shown in FIG. 4, with the quantum key distribution network QKDN only being used for transmitting quantum keys between neighbouring nodes. The double arrows visible in FIG. 3 between each of the transmission nodes N1, N2, N3, N4 and N5 of the communication network N and the key management device KM, or between the control plan management device CP and each of the transmission nodes N1, N2, N3, N4 and N5, or even between the control plan management device CP and the key management device KM, represent communication links via the "IP" communication layer, and the dashed links in the same FIG. 3 represent links established via optical transmission means capable of transmitting quantum keys in the "quantum" communication layer.

Figure 7:
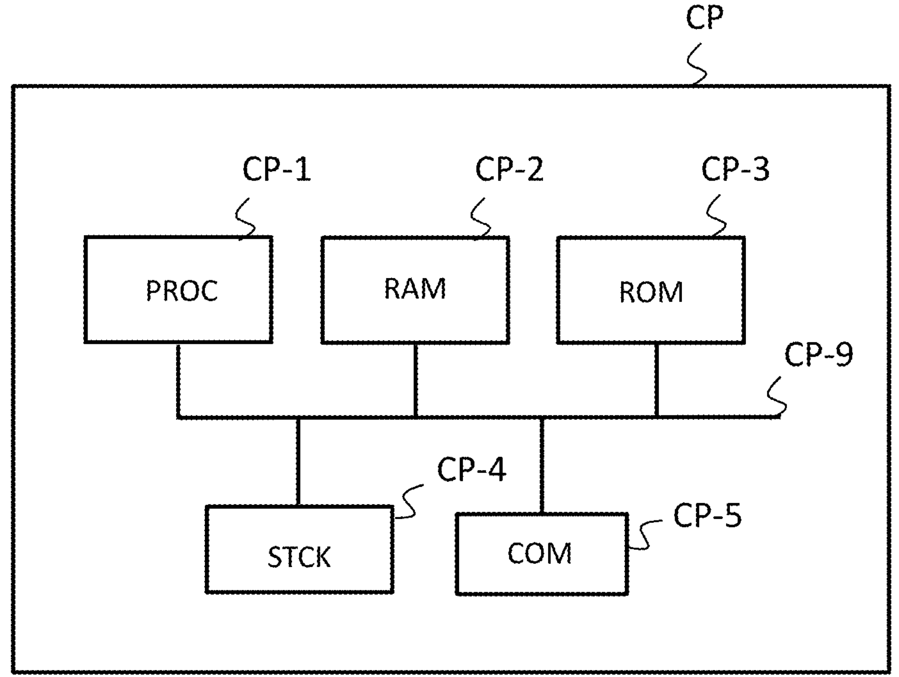
FIG. 7 illustrates an example of the internal architecture of a control plan management device as described with reference to FIGS. 3 and 4, according to one embodiment.

An example of the internal architecture of the internal control unit of the control plan management device CP is described hereafter with reference to FIG. 7.

FIG. 5 schematically illustrates an example of the internal architecture of one of the transmission nodes from among the transmission nodes N1 to N5 of the communication network 1. For illustrative purposes, FIG. 5 is considered to be illustrating an internal arrangement of the transmission node N1. It should be noted that FIG. 5 could also schematically illustrate an example of the hardware architecture of transmission node N2, N3, N4 or even N5.

According to the example of the hardware architecture shown in FIG. 5, the transmission node N1 then comprises, linked by a communication bus N1-9: a processor or CPU (Central Processing Unit) N1-1; a RAM (Random Access Memory) N1-2; a ROM (Read Only Memory) N1-3; a storage unit, such as a hard disk (or a storage medium reader, such as an SD (Secure Digital) card reader) N1-4; at least the communication interface N1-5 allowing the transmission node N1 to communicate with devices present in the communication network N such as, for example, the transmission nodes N2, N3, N4 or N5, the key management device KM or even the control plan management device CP.

The processor N1-1 is capable of executing instructions loaded into the RAM N1-2 from the ROM N1-3, an external memory (not shown), a storage medium (such as an SD card), or a communication network. When the transmission node N1 is powered up, the processor N1-1 is able to read instructions from the RAM N1-2 and to execute them. These instructions form a computer program causing the processor N1-1 to implement all or part of a content transmission method described with reference to FIG. 11 or FIGS. 8 and 9.

All or part of a method described with reference to FIG. 11, FIG. 8 and FIG. 9, or described alternative embodiments thereof, can be implemented in software form by executing a set of instructions using a programmable machine, for example, a DSP (Digital Signal Processor) or a microcontroller, or can be implemented in hardware form by a dedicated machine or component, for example, a Field-Programmable Gate Array (FPGA) or an Application-Specific Integrated Circuit (ASIC). In general, the transmission node N1 comprises electronic circuitry configured to implement the methods described in relation thereto. Obviously, the transmission node N1 further comprises all the elements commonly present in a system comprising a control unit and its peripherals, such as a power supply circuit, a power supply monitoring circuit, one or more clock circuits, a reset circuit, input/output ports, interrupt inputs, bus drivers, with this list being non-exhaustive.

FIG. 6 schematically illustrates an example of the internal architecture of the key management device KM. By way of an illustration, FIG. 6 illustrates an internal arrangement of the key management device KM.

According to the example of the hardware architecture shown in FIG. 6, the key management device KM comprises, linked by a communication bus KM-9: a processor or CPU (Central Processing Unit) KM-1; a RAM (Random Access Memory) KM-2; a ROM (Read Only Memory) KM-3; a storage unit such as a hard disk (or a storage medium reader, such as an SD (Secure Digital) card reader) KM-4; at least the communication interface KM-5 allowing the key management device KM to communicate with devices present in the communication network N, such as, for example, the transmission nodes N1, N2, N3, N4 and N5 or even the control plan management device CP.

The processor KM-1 is capable of executing instructions loaded into the RAM KM-2 from the ROM KM-3, an external memory (not shown), a storage medium (such as an SD card), or a communication network. When the key management device KM is powered up, the processor KM-1 is able to read instructions from the RAM KM-2 and to execute them. These instructions form a computer program causing the processor KM-1 to implement all or part of a content transmission method described with reference to FIG. 11 or FIGS. 8 and 9, or described alternative embodiments of this method.

All or part of the methods described with reference to FIG. 11, FIG. 8 or FIG. 9, or described alternative embodiments thereof, can be implemented in software form by executing a set of instructions using a programmable machine, for example, a DSP (Digital Signal Processor) or a microcontroller, or can be implemented in hardware form by a dedicated machine or component, for example, a Field-Programmable Gate Array (FPGA) or an Application-Specific Integrated Circuit (ASIC). In general, the key management device KM comprises electronic circuitry configured to implement the methods described in relation thereto. Obviously, the key management device KM further comprises all the elements commonly present in a system comprising a control unit and its peripherals, such as a power supply circuit, a power supply monitoring circuit, one or more clock circuits, a reset circuit, input/output ports, interrupt inputs, bus drivers, with this list being non-exhaustive.

FIG. 7 schematically illustrates an example of the internal architecture of the control plan management device CP.

According to the example of the hardware architecture shown in FIG. 7, the control plan management device CP then comprises, connected by a communication bus CP-9: a processor or CPU (Central Processing Unit) CP-1; a RAM (Random Access Memory) CP-2; a ROM (Read Only Memory) CP-3; a storage unit such as a hard disk (or a storage medium reader, such as an SD (Secure Digital) card reader) CP-4; at least the communication interface CP-5 allowing the control plan management device CP to communicate (via the IP layer) with devices present in the communication network N, such as, for example, the transmission nodes N1, N2, N3, N4 and N5, as well as the key management device KM.

The processor CP-1 is capable of executing instructions loaded into the RAM CP-2 from the ROM CP-3, an external memory (not shown), a storage medium (such as an SD card), or a communication network. When the control plan management device CP is powered up, the processor CP-1 is able to read instructions from the RAM CP-2 and to execute them. These instructions form a computer program causing the processor CP-1 to implement all or part of a method for transmitting content, such as, for example, the content A, through the communication network N, as described with reference to FIG. 11 or described alternative embodiments of this method.

All or part of the methods described with reference to FIG. 11, FIG. 8 or FIG. 9, or described alternative embodiments thereof, can be implemented in software form by executing a set of instructions using a programmable machine, for example, a DSP (Digital Signal Processor) or a microcontroller, or can be implemented in hardware form by a dedicated machine or component, for example, a Field-Programmable Gate Array (FPGA) or an Application-Specific Integrated Circuit (ASIC). In general, the control plan management device CP comprises electronic circuitry configured to implement the methods described in relation thereto. Obviously, the control plan management device CP further comprises all the elements commonly present in a system comprising a control unit and its peripherals, such as a power supply circuit, a power supply monitoring circuit, one or more clock circuits, a reset circuit, input/output ports, interrupt inputs, bus drivers, with this list being non-exhaustive.

Figure 8:
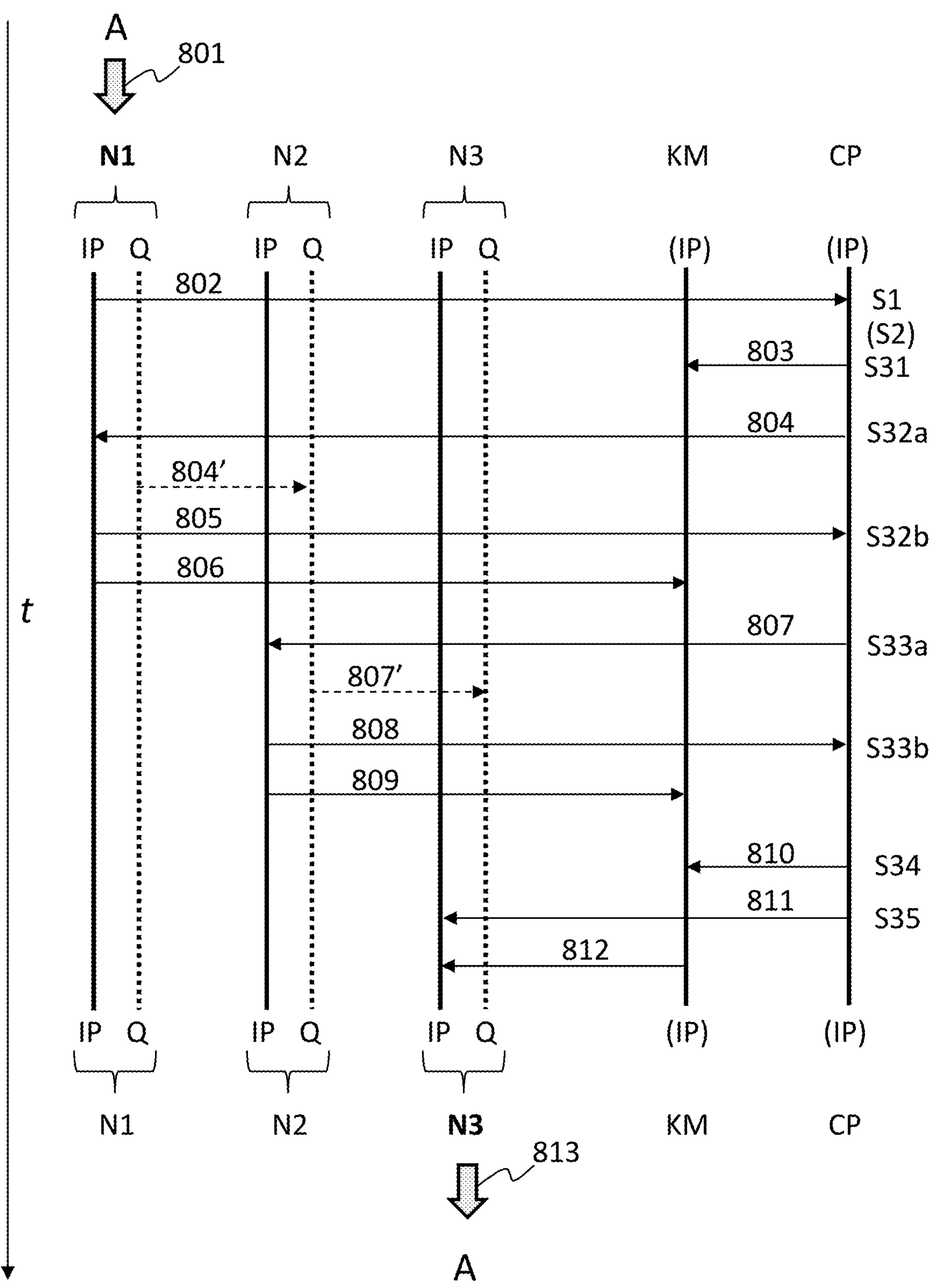
FIG. 8 is a diagram illustrating a sequence of operations implemented according to a method for transmitting content A between two transmission nodes of a communication network, via an intermediate communication node, according to one embodiment.

An example of the transmission of content A between the transmission node N1 and the transmission node N3 of the communication network N is illustrated in FIG. 8. FIG. 8 shows a sequence of operations (or even sequences or steps) between the various devices connected to the communication network N and cooperating in order to transfer the content A via the communication network N. According to the example described, the transmission node N1 is the source transmission node and the transmission node N3 is the recipient transmission node. The content transfer process uses the intermediate node N2 between the source transmission node N1 and the recipient transmission node N3. The set {N1; N2; N3} forms a route R that is determined for transmitting the content A via the communication network N.

Prior to the sequencing illustrated with reference to FIG. 8, a software module higher than the network layer transmitting the content A sends the content A to said network layer in a message 801. In FIG. 8, the successive control messages triggering the operations that are successively performed are represented by horizontal arrows between the elements that are involved, namely the transmission nodes N1, N2 and N3, the key management device KM and the control plan management device CP. Each of the transmission nodes is illustrated by a double vertical bar (IP layer denoted "IP" and quantum layer denoted "Q"). Reading from top to bottom corresponds to the passage of time, symbolised by the vertical arrow labelled t in FIG. 8. It is assumed in this case that sending a message covers a negligible duration and that an arrow representing it is therefore horizontal. According to one embodiment, the content A is fully transmitted to the transmission node N1. According to an alternative embodiment, the content A is fragmented into a plurality of fragments and the process described hereafter is repeated as necessary to transmit all the content A by successive transmissions of the fragments of the content A. The message 801 includes information to the effect that the content A is intended to be transmitted to the transmission node N3 of the communication network N. The network layer of the transmission node N1 configured to collaborate with the transmission of the content A then sends the control plan management device CP, during a step S1, a message 802 requesting the transmission of the content A. This message 802 requesting the transmission of the content A includes information to the effect that the transmission node receiving the content A is the transmission node N3. During a step S2 (not associated with sending a control message), the control plan management device CP determines a route (in this case, the route R={N1; N2; N3}) in the communication network. The route R is determined, for example, in such a way as to optimise the time for transmitting the content A in the communication network N, or is even determined as a function of the reliability of the transmission links between the various transmission nodes of the communication network N, or even according to a combination of the two. According to another example, determining a route depends on the quantum keys available in the quantum key buffer memories of all or some of the quantum interfaces of the transmission nodes. These examples are obviously not limiting and a route R can be determined in any manner between the source transmission node and the recipient transmission node. The details for implementing a method for determining a route R between a source transmission node and a recipient transmission node via one or more successive intermediate nodes are not developed herein insofar as this is not useful for a proper understanding of the invention. A person skilled in the art will be able to select an algorithm for determining a route from among a large number of routing possibilities depending on the type of communication network N and any other parameters or constraints. According to one embodiment, the control plan management device CP acquires a route determined by and from a third-party device configured to carry out such route determination as a function of one or more predefined parameters.

Once the route R has been acquired, the control plan management device CP that has received the request to transmit the content A assigns a service identifier (a number, for example) ServId to the content transmission, allowing a common reference to be created for any operation required in connection with this transmission of the content A between the source transmission node and the recipient transmission node. This assignment is also performed during step S2. The control plan management device CP then sends, during a step S31, a control message 803 to the key management device KM. This message 803 includes the assigned service identifier ServId, which allows the control plan management device CP to perform actions in relation to the transfer of the content A in the communication network N, depending on other future control messages. The control plan management device CP then determines and performs a precise sequence for organising the transfer of the content A via the determined route. Thus, a first control message is sent to the source transmission node, then control messages are successively sent to all the intermediate nodes on the route, and finally a control message is sent to the recipient transmission node. This control message sent to the recipient node is preceded by a control message sent to the key management device KM, which can then notify the recipient transmission node that it is the last transmission node on the determined route in relation to the transmission service identified via the service identifier ServId, with the notification allowing the recipient node to perform its own actions.

Thus, a control message 804 is sent by the control plan management device CP to the transmission node N1 during a step S32*a*, which control message 804 comprises the service identifier ServId as well as an identifier of a quantum key emission interface of the transmission node N1, or, more specifically, of a quantum interface of the quantum module QN1 of the transmission node N1. The selection of the quantum key emission interface is determined so that the quantum module QN1 can send a quantum key to the next transmission node in the path that is the route R determined for transmitting the content A in the communication network N. To this end, each of the transmission nodes N1, N2 and N3 has previously notified the control plan management device CP of the number of quantum key emission interfaces it has available and to which neighbouring transmission node device each of its interfaces is connected. These notifications are provided during a prior phase of recognising the characteristics of the transmission nodes that are interconnected to form the communication network N.

The control message 804 therefore allows the transmission node N1 to know to which of the next transmission nodes in the determined route R it has to send a quantum key allowing said node to perform subsequent operations participating in the secure transmission of the content A, notably by implementing a key derivation function and sending the result of this operation to the key management device KM. Following the receipt of the control message 804, the transmission node N1 transmits a quantum key k11 to the transmission node N2 in a message 804', which transmission node N2 is defined as being the next transmission node in the determined route. The transmission node N1 then sends a control message 805, during a step S32*b*, in response to the control message 804 that it has received.

The control message 805 sent by the transmission node N1 to the control plan management device CP includes the service identifier ServId used as a common reference for any control message relating to the transmission of the content A in the communication network N, as well as an identifier of the quantum key transmitted to the transmission node N2 (the next node in the determined route) to be considered for performing the subsequent operations for which this transmission node is responsible. Furthermore, the transmission node N1, the source node, performs a key derivation function KDF, in this case of the xor type between the content A and the quantum key sent to the transmission node N2, and sends the result to the key management device KM in a control message 806 further comprising the service identifier ServId. According to a substantially similar process, except for the fact that the next node in the determined route R is not the source node, but is in fact an intermediate node, the control plan management device CP then sends the intermediate transmission node N2, during a step S33*a*, a control message 807, which control message 807 comprises the service identifier ServId and a quantum key emission interface identifier to be used in order to send, from the transmission node N2, a quantum key to the next transmission node in the determined route R, in this case and according to the example described, the recipient transmission node N3. In a similar manner to what has been executed by the source transmission node N1, the intermediate transmission node N2 sends a quantum key k21 to the transmission node N3 (the next node in the determined route) in a message 807', as well as a control message 808, during a step S33*b*, in response to the received control message 807, and sends a control message 809 to the key management device KM. The control message 809 sent to the key management device KM includes the result of a key derivation function KDF applied to the quantum key received from the previous node and to the quantum key sent to the next node, together with the service identifier ServId. For its part, the key management device KM implements a key derivation function KDF, in this case the xor function, between the result previously received from the transmission node N1 (source node) and the result received from the transmission node N2 (intermediate node) and stores this result. The control plan management device CP then sends a control message 810, during a step S34, to the key management device KM, considering the next transmission node in the determined route R to be the recipient node N3. The control message 810 includes, in addition to the service identifier ServId, information to the effect that the next transmission node, in this case the transmission node N3, is the transmission node recipient of the content A, in other words, the last node of the determined route R. This information forms an end of sequence identifier. According to an example of an implementation, the end of sequence identifier is a specific code such as, for example, the code "FF". According to one embodiment, this code is transmitted in a data field designed to convey a sequence number such as a unique sequence identifier from a series of unique sequence identifiers determined for transmitting the content A in relation to the service identifier ServId. This control message allows the key management device KM to know that it must send the recipient transmission node a control message including the final result of the successive key derivation function KDF operations that it has performed. This final result is, in this case and according to the transmission example already described with reference to FIG. 2: (A⊕k11)⊕(k11⊕k21). The control plan management device CP also sends, during a step S35, a control message 811 to the recipient transmission node N3. This control message 811 includes, in addition to the service identifier ServId, a quantum key identifier to be considered for performing a subsequent operation for determining the content A from the quantum key received from the preceding intermediate transmission node in the determined route and from the final result of key derivation operations received from the key management device KM. The final result of the operations performed by the key management device KM is sent to the recipient transmission node N3 in a control message 812. Finally, the recipient node N3 uses a message 813 to send the content A to an application layer or at the very least to an application module of the transmission node N3 configured to receive the content A or even the fragment of the relevant content A in the event that the content A is transmitted in a fragmented manner by a series of executions of the sequencing described above.

Overall and to summarise, the sequencing of the operations aimed at transmitting the content A, or, if applicable, a fragment of the content A, between a source transmission node and a recipient transmission node, possibly via a plurality of intermediate transmission nodes, along a determined route R, comprises successively sending and receiving control messages, by the control plan management device CP, to each of the transmission nodes forming the determined (transmission) route R, in this case considered to be the "current transmission node", so that:

- the current transmission node sends, via one of its quantum key transmission interfaces, a quantum key to the next node in the determined route, unless the current node is the recipient transmission node;
- the current transmission node sends the key management device KM a result of a key derivation function KDF applied to a received quantum key, on the one hand, and a sent quantum key, on the other hand, when the current transmission node is an intermediate transmission node, or a result of this key derivation function KDF applied to the content A or to a fragment of the content A, on the one hand, and a sent quantum key, on the other hand, when the current transmission node is the source transmission node;
- the current transmission node receives a final result of successive key derivation operations from the key management device KM and determines the content A or a fragment of the content A, if applicable, when the current transmission node is the recipient node.

To this end, the control plan management device CP also sends, prior to these control messages, a first control message (or preliminary message) to the key management device KM, when the current transmission node is the source node, and a second control message (or end of sequence message) to the key management device KM, when the current transmission node is the recipient transmission node. The first message sent to the key management device KM includes a transmission service identifier ServId and the second message sent to the key management device KM includes information to the effect that the current transmission node is the recipient transmission node for the content A or a fragment of the content A, if applicable.

It is clear from the above summary that the method for transmitting content A as described is also functional between a source transmission node and a recipient transmission node when these two transmission nodes are neighbours in the communication network N, i.e., without an intermediate transmission node between the source transmission node and the recipient transmission node. Indeed, nothing prevents content from being sent between two neighbouring transmission nodes.

In such cases, the source transmission node (for example, N1) implements a key derivation function KDF between the content A to be transmitted (or a fragment of this content if applicable) and a quantum key it has available (k11, for example) and then transmits the result re1 to the key management device KM, in addition to transmitting this quantum key k11 to the next transmission node, which is the recipient node (for example, N2). For its part, the recipient node (in this case N2) therefore receives, from the key management device KM, the result re1 of the key derivation function KDF previously performed by the source node, and performs a new key derivation function KDF between this received result re1 and the received quantum key k11, so as to retrieve the transmitted content A. Thus, and even without an intermediate transmission node in the determined (direct) route, the transmission of the content is secure since $((A \oplus k11) \oplus k11) = A$, with $re1 = (A \oplus k11)$ which travels via the key management device KM.

According to the embodiment described herein, the key derivation function KDF is the xor function. However, this example is not limiting and another key derivation function KDF can have the same properties, according to which, when said function KDF is applied to two data items a and b, called input data, the result re=KDF (a, b) of said function applied to said two data items is zero when said two data items a and b are equal to each other, and the result re=KDF (a, b) of said function KDF (a, b) applied to said two data items a and b is equal to one of said two data items from among a and b when the other one of said two data items from among a and b is zero.

According to one embodiment, an acknowledgement of receipt is delivered to the sender of a control message by the recipient of the control message for each of the described control messages. This relates to the control messages sent from the transmission nodes, the key management device KM and the control plan management device CP. This notably advantageously allows a malfunction or an interruption of a transmission link in the communication network N to be detected.

As a communication network experiences reductions in communications performance due to congestion or malfunctions, network performance monitoring can lead to a new route R being determined for transmitting content, either prior to the start of transmission or during transmission.

Figure 9:
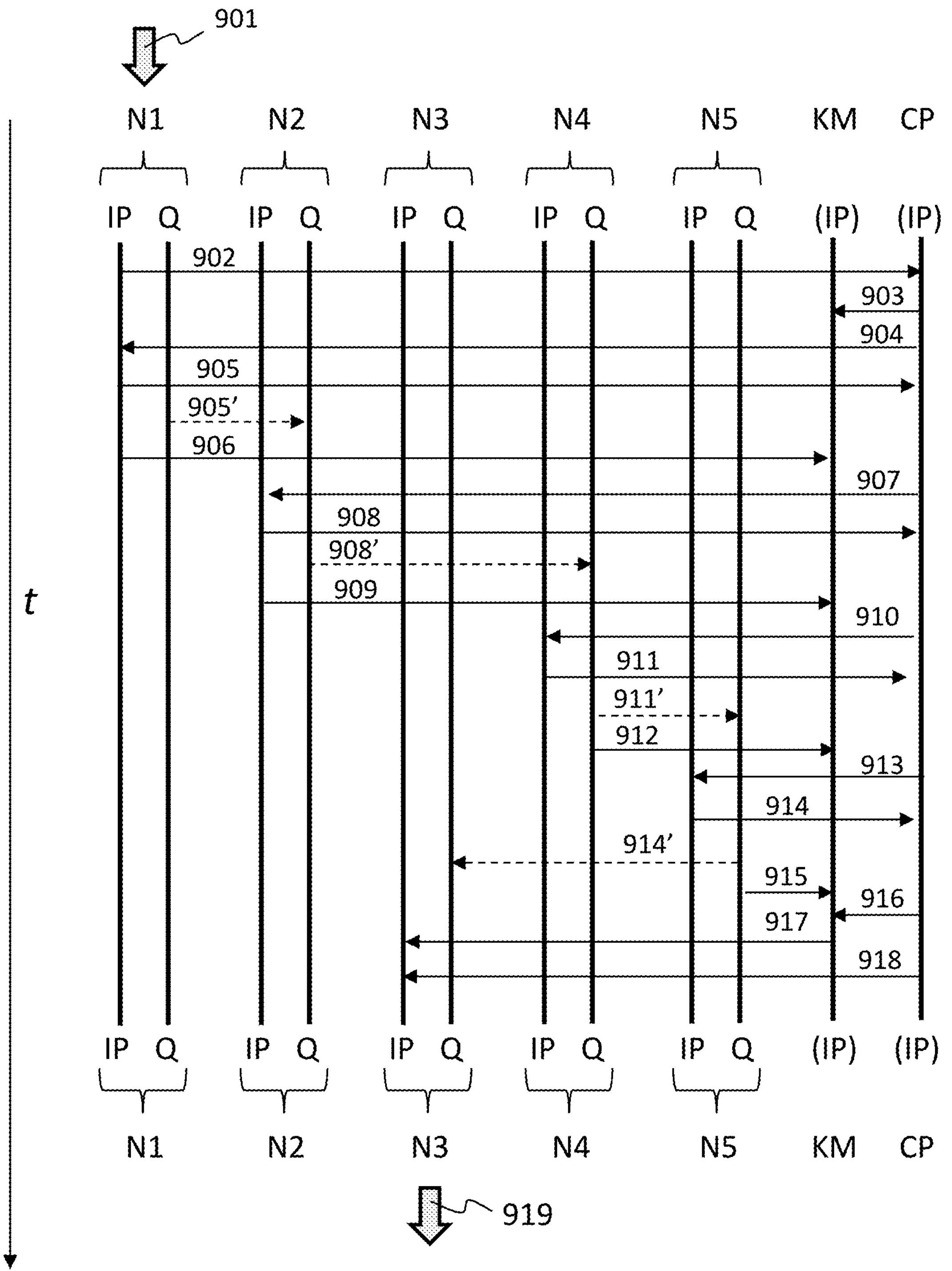
FIG. 9 is a diagram illustrating a sequence of operations implemented according to a method for transmitting content A between two transmission nodes of a communication network, via three intermediate transmission nodes, according to one embodiment.

FIG. 9 describes a suitable sequence of operations for transmitting the content A in the communication network N when the communication link of the quantum layer of the communication network N that has already been described is interrupted between the transmission node N2 and the transmission node N3, still in the case of transmission between the source transmission node N1 and the recipient transmission node N3. According to the example described with reference to FIG. 9, the route R' determined by the control plan management device CP is then R'={N1; N2; N4; N5; N3}. After receiving the content A in a message 901, on the transmission node N1, the source transmission node N1 sends to the control plan management device CP a message 902 comprising a request for transmitting the content A to the transmission node N3. The control plan management device CP determines the route R'={N1; N2; N4; N5; N3}, dispensing with having to transmit a quantum key between the transmission node N2 and the transmission node N3, with the useful link for this purpose being faulty, as well as a service identifier ServId specific to this transmission via this determined route R'. The control plan management device CP then sends this service identifier ServId to the key management device KM in a control message 903. Then, as in the example previously described with reference to FIG. 8, for each of the successive source and intermediate transmission nodes N1, N2, N4 and N5 defining the determined route R' {N1; N2; N4; N5; N3} to the recipient transmission node N3, the control plan management device CP sends a control message determining to which quantum key transmission interface the current transmission node has to send a quantum key, and receives a message comprising a quantum key identifier to be processed by the next transmission node in the determined route. Sending the control message to the current transmission node also triggers sending, by the transmission node configured to this end, of a message comprising the result of a key derivation operation, via a key derivation function KDF, to the key management device KM. Thus, the control plan management device CP successively sends a control message 904 to the source transmission node N1, which responds with a control message 905, then a control message 907 to the intermediate transmission node N2, which responds with a control message 908, then a control message 910 to the intermediate transmission node N4, which responds with a control message 911, then a control message 913 to the intermediate transmission node N5, which responds with a control message 914. These control messages respectively trigger the transmission of quantum keys in messages 905', 908', 911' and 914'. Finally, the control plan management device CP sends a control message 916 to the key management device KM including information to the effect that the next transmission node is the recipient node, so that the key management device KM transmits, in a message 917, the final result of successive key derivation function operations that it has implemented based on messages 906, 909, 912 and 915 received from each of the source and intermediate nodes defining the determined route R' towards the recipient node N3 and each comprising a key derivation operation result performed by the transmission node sending the relevant message. The control plan management device CP then sends a control message 918 to the recipient transmission node N3, which message includes a quantum key identifier to be considered for retrieving the content A from the final result received from the key management device KM and the quantum key received from the previous transmission node in the determined route R'. The recipient transmission node N3 then transmits, in a message 919, the reconstituted content A to an application module of the recipient transmission node N3 intended to receive it. In the same way as for the example of transmission already described with reference to FIG. 8, the content A can be fully transmitted according to the method described above, or it even can be divided into fragments so that the fragments are successively transmitted during successive iterations of the method described above.

According to one embodiment, the control messages sent by the control plan management device CP to the source transmission node or to the intermediate transmission nodes each comprise a unique sequence identifier SeqNum from a series of unique sequence identifiers determined for transmitting the content A in relation to the service identifier ServId. According to this embodiment, each unique sequence identifier in the series of unique identifiers is able to determine the rank of a sequence (or operation, or step) with which it is associated in a series of sequences defined in relation to the transmission of the content A. This advantageously allows an order to be defined for performing successive operations carried out by the key management device KM in the event that the key derivation function used by the key management device KM does not have commutativity properties allowing successive operations to be performed with a result that is independent of the sequencing, as is the case for the xor function, for example, applied to two input data items a and b. In addition, the use of a unique sequence identifier makes it possible to operate by modifying the determined route when transmitting content A in the event of a malfunction in a transmission node, by resuming routing from a previous node in the route determined by the control plan management device.

Still according to this embodiment, each of the transmission nodes is configured to relay, in the message comprising a key derivation function result, the unique sequence identifier that it has received from the control plan manager CP to the key management device KM. According to an alternative embodiment, the transmission nodes are not configured to relay the unique sequence identifiers received from the control plan management device CP to the key management device KM, and said control plan management device CP directly sends these unique identifiers, which are coherently defined (for example, following an incremental order), so that the key management device KM knows how to order the operations to be performed depending on the respective values of these unique identifiers received from the control plan management device CP.

Figure 11:
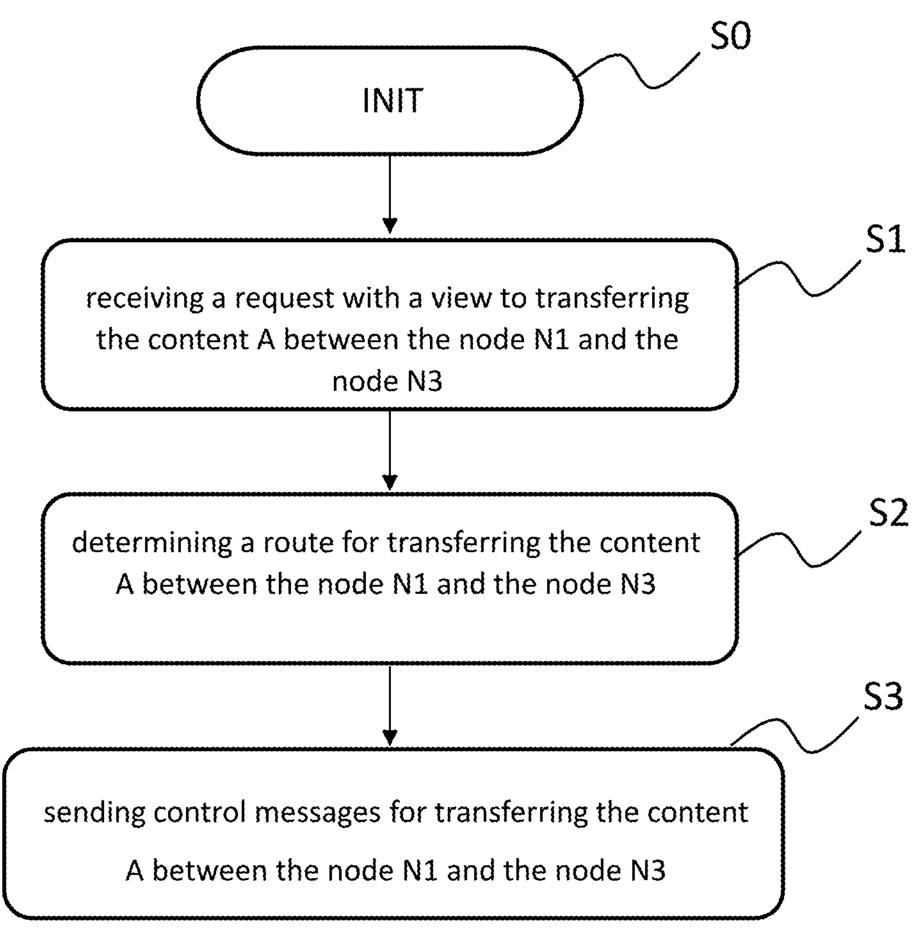
FIG. 11 is a flow chart illustrating a method for transmitting content A between two transmission nodes of a communication network, via at least one intermediate communication node, executed in a control plan management device according to one embodiment.

FIG. 11 is a flowchart illustrating the steps of a method for transmitting content A through the communication network N, between the transmission node N1, called source node, and the transmission node N3, called recipient node. A step S0 corresponds to an initialisation step, at the end of which all the transmission nodes N1, N2 and N3 are configured to nominally implement communications via "IP" communication links and quantum key transmissions via the quantum key distribution network QKDN. On completion of step S0, the key management device KM and the control plan management device CP are also configured and ready to operate. In particular, each transmission node is ready to receive, from an application layer or an application module, a message comprising a request for transmitting content in the communication network N. During the step S1, the source node N1 receives a message comprising a request for transmitting the content A to the recipient node N3, also called transmission request message. The source node N1, having then understood that it must operate as a source node, sends a message requesting transmission of the content A to the control plan management device CP, which is configured to orchestrate content transmissions in the communication network N. The control plan management device CP then determines, during the step S2, a route R for transmitting the content A in the communication network N. According to the example described herein, the determined route R includes the transmission node N2, called intermediate node N2. The control plan management device also determines a service identifier ServId, associated with the determined route R, which identifier can act as a reference for any subsequent action useful for transmitting content A through the communication network N, and notably for referring to this transmission of the content A in control messages that it defines in order to orchestrate the interactions between the transmission nodes N1, N2, N3, the key management device KM and itself. Finally, during the step S3, the control plan management device CP determines and sends successive control messages in order to implement the transmission of the content A using the quantum key distribution network QKDN in order to make the transmission of the content A as secure as possible. According to the example described herein, the control messages for transferring content A in step S3 are the messages 803 to 813 as described with reference to FIG. 8 or even messages or equivalent messages (potentially including ancillary information).

According to one embodiment of the invention, the control messages exchanged during step S3 include additional information, in addition to that useful for transmitting the content A according to the described method. For example, such information can be used to avoid using two identical quantum keys.

According to one embodiment, a quantum key identifier can be a quantum key length and each of the quantum keys generated in the same transmission node has a different length, at least in the same reference period.

The content transmission method, executed by the control plan management device CP, advantageously allows end-to-end control of the operations required for securely transmitting the content A, offering a very high level of security in view of the use of a quantum key distribution network. It is thus possible to avoid numerous attacks, notably "man-in-the-middle" type attacks. Advantageously, such a method also allows modifications of the routing to be implemented during transmission. The method is also compatible with any size of quantum keys.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for transmitting content between two transmission nodes of a communication network comprising said two transmission nodes and at least one other transmission node, called an intermediate transmission node, said transmission nodes being included in a quantum key distribution network for keys, called quantum keys, the communication network comprising a key management device connected to said transmission nodes and connected to said quantum key distribution network, said transmission nodes each comprising a plurality of communication interfaces for communicating in the communication network and a plurality of quantum key transmission interfaces for transmitting and receiving said quantum keys in said quantum key distribution network, and said transmission nodes further being configured to each perform a key derivation function and send a result thereof to said key management device and to each perform a key extraction function from information received from said key management device and a quantum key, said communication network further comprising a control plan manager connected to said transmission nodes and to said key management device and resources of which are contained in an item of equipment or a system intended for organizing a sequence of operations useful for securely transferring content between two transmission nodes of the communication network, said method comprising, executed in said control plan manager:

receiving, from a node, called source node, from among said two transmission nodes, a request message requesting transmission of said content to the other node, called recipient node, from among said two transmission nodes, said request message comprising an identifier of said recipient node;

acquiring a route determined as passing through said at least one intermediate transmission node or through a series of intermediate transmission nodes between said source node and said recipient node, and a service identifier for transmitting said content associated with said route; and, transmitting and receiving control messages to and from said transmission nodes and to said key management device, suitable for generating key transmissions between pairs of nodes from among said nodes, defined according to said route determined in relation to said transmission service identifier, wherein said transmitting and receiving control messages causes:

the source node to perform one said key derivation function between the content and one said quantum key that is transmitted to a subsequent node in the route to produce a source node result, and to send the source node result to the key management device;

the at least one intermediate transmission node to perform one said key derivation function between one said quantum key received from a preceding node in the route and one said quantum key that is transmitted to another subsequent node in the route to produce an intermediate node result, and to send the intermediate node result to the key management device; and the key management device to combine the source node result and the at least one intermediate node result to produce a final result and send the final result to the recipient node, thereby enabling the recipient node to perform the key extraction function to retrieve the content.

2. The method according to claim 1, wherein sending and receiving said control messages comprises:

sending, to said key management device, a control message comprising said service identifier;

sending, to said source node, a control message comprising at least said service identifier and an identifier of a quantum key emission interface;

receiving, from said source node, a control message comprising at least one quantum key identifier and said service identifier for transmitting said content;

sending, to each intermediate transmission node, a control message comprising at least said service identifier, a quantum key reception interface identifier, a quantum key identifier received or to be received via said quantum key reception interface and a quantum key emission interface identifier;

receiving, from each intermediate transmission node, a control message comprising at least one quantum key identifier and said service identifier for transmitting said content;

sending, to said key management device, a control message comprising an end of sequence identifier and an identifier of the recipient node; and sending, to said recipient node, a control message comprising at least said service identifier, a quantum key reception interface identifier and a quantum key identifier received or to be received via said quantum key reception interface.

3. The method for according to claim 2, wherein sending the control message to said source node and sending a control message to each of said intermediate nodes further comprises a unique sequence identifier from a series of unique sequence identifiers determined for said transmission of said content in relation to said service identifier, each unique sequence identifier from said series of unique identifiers being able to determine a rank of a sequence with which it is associated in a series of sequences defined in relation to said transmission of said content.

4. The method according to claim 1, wherein the key derivation function has properties according to which said function applies to two data items, called input data, and a result of said function applied to said two data items is zero when said two data items are equal to each other and the result of said function applied to said two data items is equal to one of said two data items when the other one of said two data items is zero.

5. The method according to claim 4, wherein the key derivation function is an "exclusive OR" function and wherein said two data items comprise binary words with identical sizes.

6. A device for controlling a transmission of content between two transmission nodes of a communication network comprising said two transmission nodes and at least one other transmission node, called intermediate transmission node, said transmission nodes also being included in a quantum key distribution network for keys, called quantum keys, the communication network comprising a key management device connected to said transmission nodes and connected to said quantum key distribution network, said transmission nodes each comprising a plurality of communication interfaces for communicating in the communication network and a plurality of quantum key transmission interfaces for transmitting and receiving said quantum keys in said quantum key distribution network, and said transmission nodes being further configured to each perform a key derivation function and send a result thereof to said key management device and to each perform a key extraction function from information received from said key management device and a quantum key, said communication network further comprising said control plan management device connected to said transmission nodes and to said key management device and, the device comprising:

electrical and electronic circuitry, contained in an item of equipment or a system, configured to organize a sequence of operations for securely transferring content between two transmission nodes of the communication network configured for:

receiving, from a node, called source node, from among said two transmission nodes, a request message requesting transmission of said content to the other node, called recipient node, from among said two transmission nodes, said request message comprising an identifier of said recipient node;

acquiring a route determined as passing through said at least one intermediate transmission node or through a series of intermediate transmission nodes between said source node and said recipient node, and a service identifier for transmitting said content associated with said route; and transmitting and receiving control messages to and from said transmission nodes and to said key management device, suitable for generating key transmissions between pairs of nodes from among said nodes, defined according to said route determined in relation to said transmission service identifier, wherein the electrical and electronic circuitry is configured to transmit and receive control messages that are configured to cause:

the source node to perform one said key derivation function between the content and one said quantum key that is transmitted to a subsequent node in the route to produce a source node result, and to send the source node result to the key management device;

the at least one intermediate transmission node to perform one said key derivation function between one said quantum key received from a preceding node in the route and one said quantum key that is transmitted to another subsequent node in the route to produce an intermediate node result, and to send the intermediate node result to the key management device; and the key management device to combine the source node result and the at least one intermediate node result to produce a final result and send the final result to the recipient node, thereby enabling the recipient node to perform the key extraction function to retrieve the content.

7. The device according to claim 6, further comprising: electronic circuitry configured for:

sending, to said key management device, a control message comprising said service identifier;

sending, to said source node, a control message comprising at least said service identifier, an identifier of a quantum key emission interface;

receiving, from said source node, a control message comprising at least one quantum key identifier and said service identifier for transmitting said content;

sending, to each intermediate transmission node, a control message comprising at least said service identifier, a quantum key reception interface identifier and a quantum key identifier received or to be received via said quantum key reception interface, a quantum key emission interface identifier;

receiving, from each intermediate transmission node, a control message comprising at least one quantum key identifier and said service identifier for transmitting said content;

sending, to said key management device, a control message comprising an end of sequence identifier and an identifier of the recipient node; and sending, to said recipient node, a control message comprising at least said service identifier, a quantum key reception interface identifier and a quantum key identifier received or to be received via said quantum key reception interface.

8. The device according to claim 7, further comprising:

electronic circuitry configured to introduce, into the control message at said source node and into the control message at each of said intermediate nodes, a unique sequence identifier from a series of unique sequence identifiers determined for said transmission of said content in relation to said service identifier, each unique sequence identifier from said series of unique identifiers being able to determine a rank of a sequence with which it is associated in a series of sequences defined in relation to said transmission of said content.

9. A communication network comprising:

a plurality of transmission nodes, a key management device, and the device according to claim 8, wherein each of the transmission nodes is further configured for:

sending a control message to the key management device, said message sent to said key management device comprising a key derivation function result, said service identifier a sequence identifier from a series of unique identifiers determined for said transmission of said content in relation to said service identifier, each unique sequence identifier from said series of unique sequence identifiers configured to determine a rank of a sequence with which it is associated in a series of sequences defined in relation to said transmission of said content; and receiving, from said key management device, a control message comprising said service identifier and a key derivation function result.

10. A non-transitory computer readable media storing a computer program comprising instructions for executing the method according to claim 1, when said computer program is executed by a processor.

* * * * *